United States Patent
Kim

(10) Patent No.: US 8,064,372 B2
(45) Date of Patent: Nov. 22, 2011

(54) WIRELESS TRANSCEIVER AND RELAY STATION INCLUDING THE WIRELESS TRANSCEIVER

(75) Inventor: Byoung Hoon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 201 days.

(21) Appl. No.: 12/467,697

(22) Filed: May 18, 2009

(65) Prior Publication Data

US 2010/0142416 A1    Jun. 10, 2010

Related U.S. Application Data

(60) Provisional application No. 61/074,130, filed on Jun. 19, 2008.

(30) Foreign Application Priority Data

Dec. 3, 2008  (KR) .................. 10-2008-0121702

(51) Int. Cl.
*H04B 7/14* (2006.01)
(52) U.S. Cl. .................................................. 370/279
(58) Field of Classification Search .............. 370/274, 370/279, 280, 293, 294, 315, 316, 492, 501
See application file for complete search history.

(56) References Cited

U.S. PATENT DOCUMENTS

| | | | |
|---|---|---|---|
| 7,299,005 B1 * | 11/2007 | Yarkosky et al. | 455/7 |
| 2003/0125067 A1 * | 7/2003 | Takeda et al. | 455/522 |
| 2007/0086368 A1 | 4/2007 | Lee et al. | |
| 2008/0225758 A1 * | 9/2008 | Proctor et al. | 370/279 |

FOREIGN PATENT DOCUMENTS

KR  10-2008-0025963 A    3/2008

* cited by examiner

*Primary Examiner* — Derrick Ferris
*Assistant Examiner* — Mang Yeung
(74) *Attorney, Agent, or Firm* — Birch, Stewart, Kolasch & Birch, LLP

(57) ABSTRACT

A wireless transceiver and a relay station (RS) including the wireless transceiver, where the wireless transceiver includes multiple antennas; and multiple radio frequency (RF) chain pairs that are connected one-to-one to the antennas and each of which being able to be set to operate on both a downlink frequency and an uplink frequency or to operate only on one of the downlink frequency and the uplink frequency. Each of the RF chain pairs may be able to switch a transmission (Tx) frequency and a reception (Rx) frequency between the downlink frequency and the uplink frequency. For example, each of the RF chain pairs may include a first Tx/Rx band switch that is connected between a local oscillator pair and a mixer pair; and a second Tx/Rx band switch that is connected between an amplifier pair and a duplexer.

9 Claims, 17 Drawing Sheets

824

822

824'

822'

WIRELESS TRANSCEIVER AND RELAY STATION INCLUDING THE WIRELESS TRANSCEIVER

CROSS-REFERENCE TO RELATED APPLICATIONS

This application claims the benefit of priority of U.S. Provisional application Ser. No. 61/074,130 filed on Jun. 19, 2008, and Korean Patent Application No. 10-2008-0121702 filed on Dec. 3, 2008, which are incorporated by reference in their entirety herein.

BACKGROUND OF THE INVENTION

1. Technical Field

The present invention relates to wireless communication, and more particularly, to a wireless transceiver in a wireless communication network and a relay station including the wireless transceiver.

2. Related Art

Wireless communication systems are broadly used to provide various types of communication services. A wireless communication system may be a multiple access system that can support communication with multiple users by sharing usable system resources such as bandwidths and transmission power. The multiple access system may include a code division multiple access (CDMA) system, a frequency division multiple access (FDMA) system, a time division multiple access (TDMA) system, an orthogonal frequency division multiple access (OFDMA) systems and a single carrier frequency division multiple access (SC-FDMA) system.

The wireless communication system typically includes a base station (BS) providing services to a cell that is a predetermined area around the BS. Normally, a terminal or a mobile station (MS) may communicate with the BS in service coverage of the BS. However, data communication with the BS can be disabled or communication quality may be degraded due to an obstruction such as a building or in an edge area of the cell.

Various methods have been suggested in order to expand the service coverage of the BS. One of the methods is to use a relay station (RS) in the wireless communication system. Here, the RS relays data communication between a BS and an MS (two MSs, or an MS/BS and another RS). In other words, the RS enables data communication between the BS and a distant MS by using two-hop or multi-hop links rather than a single direct link. As such, the RS can expand cell coverage and improve cell edge performance of the BS. Also, the RS can use this approach to improve a cell throughput.

Some RSs use a time division duplex (TDD) wireless communication system such as a mobile WiMAX system (e.g., IEEE 802.16j/m). The TDD wireless communication system can play the role of the RS without modifying an internal configuration or an operation method of a wireless transceiver of a legacy TDD station. In more detail, a TDD RS relays data communication between the BS and the MS by accessing an uplink or downlink channel at a scheduled time according to uplink/downlink slot allocation and resource scheduling information.

Recently, a RS relay concept has been considered as a way to improve the performance of a next generation frequency division duplex (FDD) wireless communication system. The next generation FDD wireless communication system includes, for example, an FDD-based third generation project partnership (3GPP) long-term evolution (LTE) system or a mobile WiMAX system supporting FDD.

However, the internal configuration or the operation method of the wireless transceiver of the legacy FDD station is incompatible with that of a wireless transceiver of an FDD RS. In more detail, it is assumed that a downlink frequency between an FDD BS and an FDD MS is a frequency f1 and an uplink frequency is a frequency f2 in the FDD wireless communication system. A legacy BS transmits data on the frequency f1 and receives data on the frequency f2, and a legacy MS receives data on the frequency f1 and transmits data on the frequency f2. Accordingly, the FDD RS should be able to receive data on the frequency f1 (downlink) and transmit data on the frequency f2 (uplink) at one time, while it should be able to transmit data on the frequency f1 (downlink) and receive data on the frequency f2 (uplink) at another time. However, the FDD RS requires additional features for transmission/reception (Tx/Rx) band switching. These features are not included in the conventional wireless transceiver used in the legacy FDD station.

As described above, transmission/reception (Tx/Rx) band switching is not performed by the FDD BS and the FDD MS and thus a wireless transceiver of the FDD BS or the FDD MS may not be used as the wireless transceiver of the FDD RS. In order to be used as the wireless transceiver of the FDD RS, at least Tx/Rx band switching (swapping) capability is required. Also, the FDD BS can communicate with the FDD MS in various scenarios and the FDD RS should be able to support data communication according to the various scenarios.

SUMMARY OF THE INVENTION

The present invention provides a wireless transceiver for a relay station (RS), which is capable of supporting data communication according to various scenarios available in a frequency division duplex (FDD) wireless communication system, and an RS including the wireless transceiver.

The present invention also provides a wireless transceiver for an RS, which is capable of supporting various relay modes including a multi-stream bi-directional transmission/reception (Tx/Rx) mode, in an FDD wireless communication system, an RS including the wireless transceiver, and a relay method using the wireless transceiver.

The present invention also provides a wireless transceiver for an RS, which is capable of supporting both a multiple input multiple output (MIMO) full-duplex (FD) operation and an MIMO half-duplex (HD) operation, an RS including the wireless transceiver, and a relay method using the wireless transceiver.

The present invention also provides a wireless transceiver for an RS, which is capable of adaptively performing a relay operation in an FDD wireless communication system by changing operation modes according to states of a plurality of links, an RS including the wireless transceiver, and a relay method using the wireless transceiver.

According to an aspect of the present invention, a wireless transceiver for a relay station (RS) is provided. The wireless transceiver includes a plurality of antennas, and a plurality of radio frequency (RF) chain pairs which are coupled one-to-one to the plurality of antennas, each of the plurality of RF chain pairs configured to operate on both a downlink frequency and an uplink frequency or to operate only on one of the downlink frequency and the uplink frequency, wherein each of the plurality of RF chain pairs is configured to switch a transmission (Tx) frequency and a reception (Rx) frequency between the downlink frequency and the uplink frequency.

Each of the plurality of RF chain pairs may include a first Tx/Rx band switch coupled between a local oscillator pair and a mixer pair, and a second Tx/Rx band switch coupled between an amplifier pair and a duplexer. Each amplifier coupled to a corresponding second Tx/Rx band switch may include a wideband amplifier configured to support the downlink frequency and the uplink frequency, or a group of narrowband amplifiers configured to separately support the downlink frequency and the uplink frequency.

Each of the plurality of RF chain pairs may be configured to switch the Tx frequency and the Rx frequency between the downlink frequency and the uplink frequency. All of the plurality of RF chain pairs may be configured to be switched to the same Tx frequency and the same Rx frequency. Each of the plurality of RF chain pairs may include first Tx/Rx band switch connected between a local oscillator pair and a mixer pair, and a second Tx/Rx band switch connected between an amplifier pair and a duplexer, wherein the plurality of RF chain pairs are arranged to share the first Tx/Rx band switch.

Each of the plurality of RF chain pairs may be configured to be independently switched to the Tx frequency and to the Rx frequency. Each of the plurality of RF chain pairs may include a first Tx/Rx band switch connected between a local oscillator pair and a mixer pair, and a second Tx/Rx band switch connected between an amplifier pair and a duplexer, wherein each of the plurality of RF chain pairs independently comprises the first Tx/Rx band switch.

According to another aspect of the present invention, a method of operating a relay station (RS) for a frequency division duplex (FDD) wireless communication system is provided. The method includes receiving a first signal from a superordinate station on a downlink frequency and receiving a second signal from a subordinate station on an uplink frequency at the same time, and transmitting a third signal to the superordinate station on the uplink frequency and transmitting a fourth signal to the subordinate station on the downlink frequency at the same time.

The method may further include receiving a fifth signal from the superordinate station on the downlink frequency and transmitting a sixth signal to the superordinate station on the uplink frequency at the same time, and transmitting a seventh signal to the subordinate station on the downlink frequency and receiving an eighth signal from the subordinate station on the uplink frequency at the same time. The method may further include selecting by the RS one of the first through fourth operations based on states of channels linked with the superordinate station and the subordinate station.

According to still another aspect of the present invention, a method of operating a relay station (RS) for a frequency division duplex (FDD) wireless communication system is provided. The RS has multiple antenna. The method includes selecting by the RS a relaying mode between a superordinate station and a subordinate station from one of a transmission/reception (Tx/Rx) band switching based relaying mode and a dual-band Tx/Rx based relaying mode.

A number of transport streams that are transmitted/received on each band when the RS operates in the Tx/Rx band switching based relaying mode may be greater than or equal to a number of transport streams that are transmitted/received on each band when the RS operates in the dual-band Tx/Rx based relaying mode.

A maximum number of transport streams that are transmitted/received on each band when the RS operates in the Tx/Rx band switching based relaying mode may be two, and a maximum number of transport streams that are transmitted/received on each band when the RS operates in the dual-band Tx/Rx based relaying mode may be one.

A relay station can support data communication according to various scenarios available in a frequency division duplex wireless communication system. Full-duplex mode and/or half-duplex mode may be supported by multiple antenna.

DESCRIPTION OF EXEMPLARY EMBODIMENTS

Hereinafter, the present invention will be described in detail by explaining embodiments of the invention with reference to the attached drawings. In the following description, a case when a relay station (RS) relays data communication between a base station (BS) and a mobile station (MS) will be representatively described. However, the above case is exemplarily selected for only convenience of explanation. Unless defined differently, the present invention should not be construed as being limited thereto. The following embodiments may also be applied to various cases when an RS relays data communication between a plurality of other RSs, between a plurality of MSs, between another RS and an MS, between a BS and another RS, etc.

Figure 1:
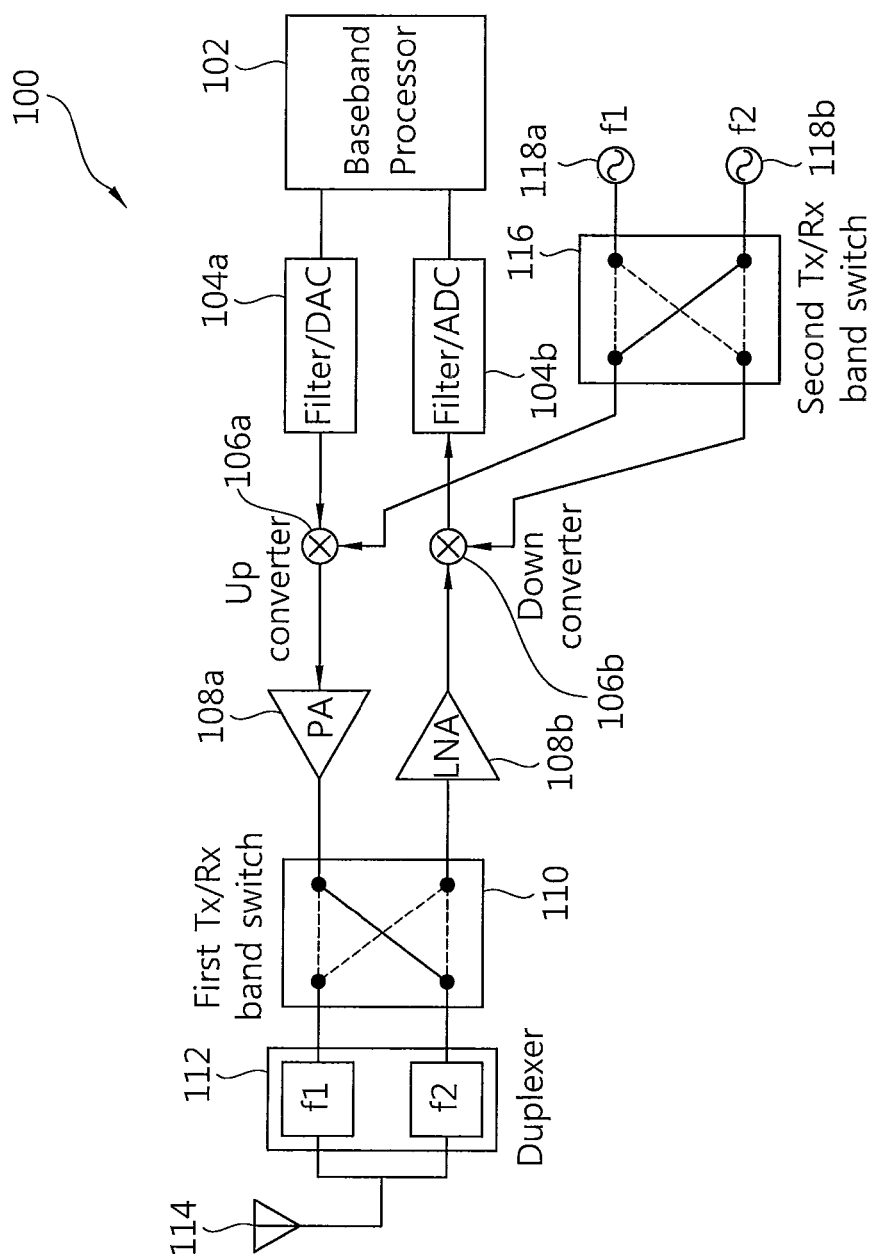
FIG. 1 is a block diagram showing an exemplary configuration of a wireless transceiver for a frequency division duplex (FDD) relay station (RS), which has transmission/reception (Tx/Rx) band switching capability.

FIG. 1 is a block diagram showing an exemplary configuration of a wireless transceiver 100 for a frequency division duplex (FDD) RS, which has transmission/reception (Tx/Rx) band switching capability. The wireless transceiver 100 illustrated in FIG. 1 supports a half-duplex (HD) operation. In the wireless transceiver 100, only one path from among an Rx path on a first frequency f1, a TX path on the first frequency f1, an Rx path on a second frequency f2, and a TX path on the second frequency f2, may be active at one time.

Referring to FIG. 1, the wireless transceiver 100 includes a baseband processor 102 or a modem, a filter/digital-to-analog converter (DAC) 104a and a filter/analog-to-digital converter (ADC) 104b, a converter pair including an up-converter 106a and a down-converter 106b, an amplifier pair including a power amplifier (PA) 108a and a low noise amplifier (LNA) 108b, a first TX/Rx band switch 110, a duplexer 112, an antenna 114, a second TX/Rx band switch 116, and a pair of local oscillators 118a and 118b. The wireless transceiver 100 consists of a pair of a Tx signal processing unit (Tx radio frequency (RF) chain) and an Rx signal processing unit (Rx RF chain). The Tx RF chain consists of the baseband processor 102, the filter/DAC 104a, the up-converter 106a, the PA 108a, the first and second TX/Rx band switches 110 and 116, the local oscillators 118a and 118b, the duplexer 112, and the antenna 114. The Rx RF chain consists of the antenna 114, the duplexer 112, the first and second TX/Rx band switches 110 and 116, the LNA 108b, the down-converter 106b, the local oscillators 118a and 118b, the filter/ADC 104b, and the baseband processor 102.

An FDD RS including the wireless transceiver 100 may operate, for example, as described below.
The FDD RS may receive a downlink signal from a BS on the first frequency f1 at a first time t1
The FDD RS may transmit a downlink signal to an MS on the first frequency f1 at a second time t2.
The FDD RS may receive an uplink signal from the MS on the second frequency f2 at a third time t1'.
The FDD RS may transmit an uplink signal to the BS on the second frequency f2 at a fourth time t2'.

Figure 2:
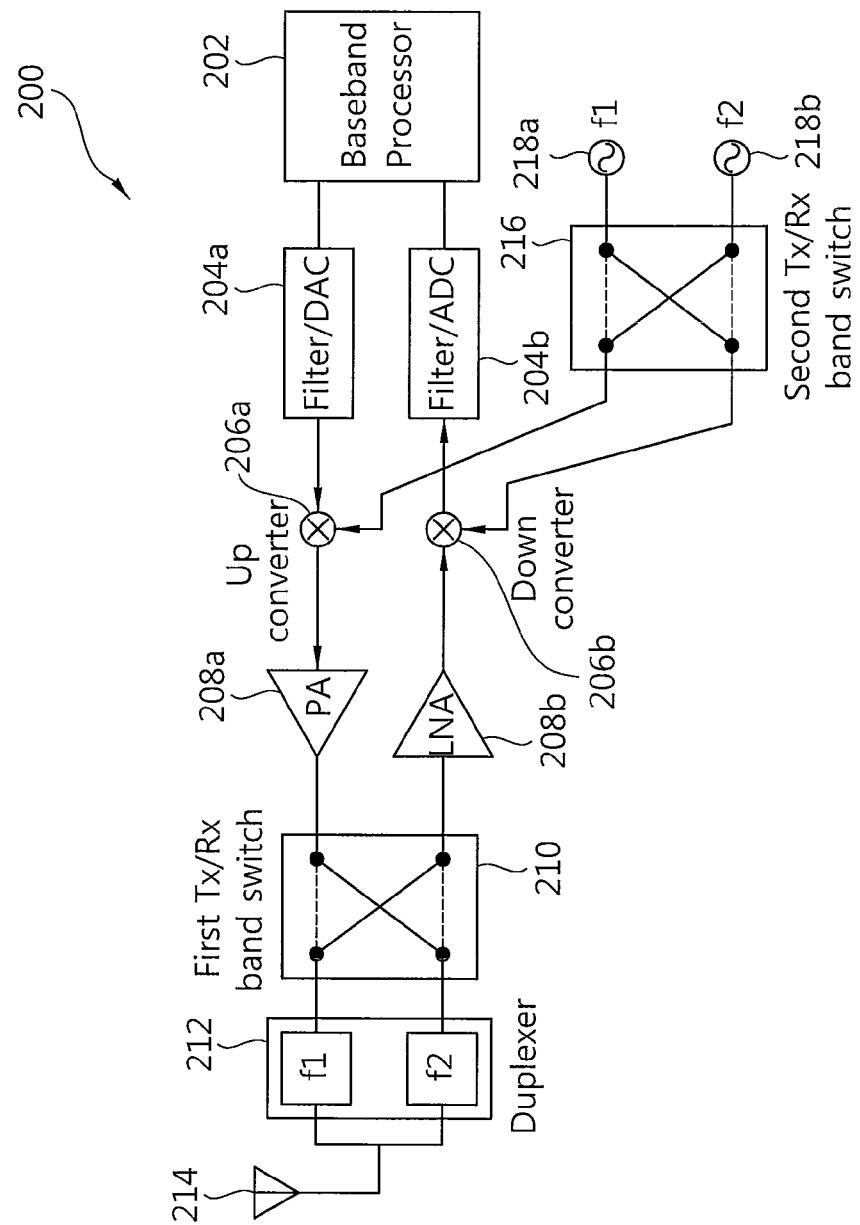
FIG. 2 is a block diagram showing another exemplary configuration of a wireless transceiver for an FDD RS, which has Tx/Rx band switching capability.

FIG. 2 is a block diagram showing another exemplary configuration of a wireless transceiver 200 for an FDD RS, which has Tx/Rx band switching capability. The wireless transceiver 200 illustrated in FIG. 2 supports a full-duplex (FD) operation. In the wireless transceiver 200, both Tx and Rx paths may be active at one time.

Referring to FIG. 2, the configuration of the wireless transceiver 200 is almost the same as that of the wireless transceiver 100 illustrated in FIG. 1. In more detail, the wireless transceiver 200 includes a baseband processor 202, a filter/DAC 204a and a filter/ADC 204b, a converter pair including an up-converter 206a and a down-converter 206b, an amplifier pair including a PA 208a and an LNA 208b, a first TX/Rx band switch 210, a duplexer 212, an antenna 214, a second TX/Rx band switch 216, and a pair of local oscillators 218a and 218b. Also, the configurations of the Tx and Rx signal processing units of the wireless transceiver 200 are the same as those of the Tx and Rx signal processing units of the wireless transceiver 100 illustrated in FIG. 1. However, the first and second TX/Rx band switches 210 and 216 are different from the first and second TX/Rx band switches 110 and 116 illustrated in FIG. 1 in that the Tx and Rx paths are active at the same time in order to support simultaneous communication using first and second frequencies f1 and f2 (see solid lines indicated in FIG. 2, and two antennas may be required for the simultaneous communication).

An FDD RS including the wireless transceiver 200 may operate, for example, as described below.
The FDD RS may receive a downlink signal from a BS on the first frequency f1 and transmit an uplink signal to the BS on the second frequency f2 at a first time t1.
The FDD RS may receive an uplink signal from an MS on the second frequency f2 and transmit a downlink signal to the MS on the first frequency f1 at a second time t2.

The FDD RS including the wireless transceiver 100 illustrated in FIG. 1 or the wireless transceiver 200 illustrated in FIG. 2 may switch Tx and Rx bands. Thus, the FDD RS may communicate with only a BS at one time or communicate with only an MS at another time. This band switching capability allows the FDD RS to adaptively relay signals between the BS and the MS by using only two time slots in order to transmit data packets.

However, the FDD RS including the wireless transceiver 100 illustrated in FIG. 1 or the wireless transceiver 200 illustrated in FIG. 2 may only support data communication with the BS or the MS at one time. That is, the illustrated FDD RS may not support simultaneous Tx to or simultaneous Rx from both a superordinate station (e.g., the BS or another RS in an upstream of downlink Tx) and a subordinate station (e.g., the MS or another RS in a downstream of the downlink Tx).

Meanwhile, an FDD RS having dual-band Tx/Rx capability may simultaneously perform downlink Tx using a first frequency f1 and uplink Tx using a second frequency f2 at one time, and may simultaneously perform downlink Rx using the first frequency f1 and uplink Rx using the second frequency f2 at another time. The dual-band Tx/Rx capability is very useful and requisite for an RS in order to support various scenarios including data delivery to the subordinate station and return of acknowledgement (ACK) to the superordinate station at the same time, etc.

Figure 3:
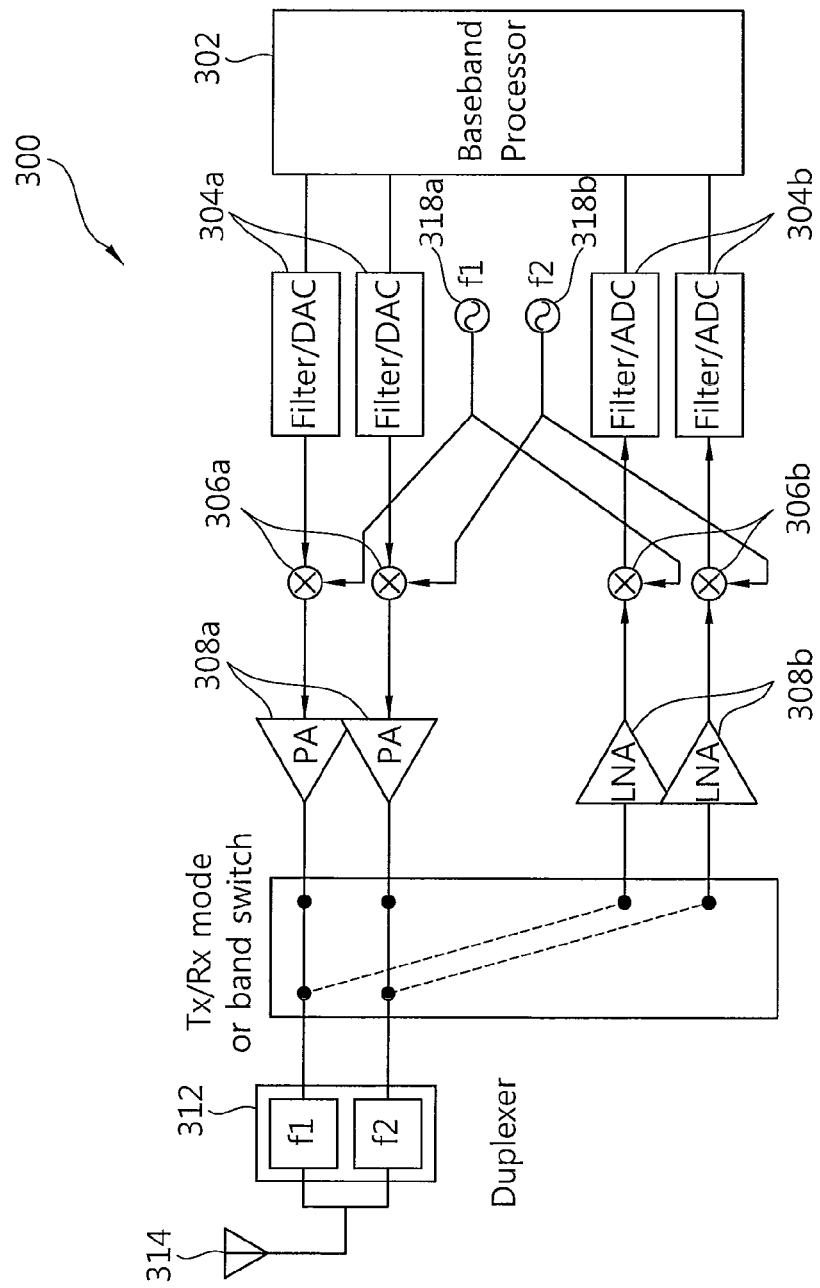
FIG. 3 is a block diagram showing an exemplary configuration of a wireless transceiver having both Tx/Rx band switching capability and duplex band Tx/Rx capability.

FIG. 3 is a block diagram showing an exemplary configuration of a wireless transceiver 300 having both Tx/Rx band switching capability or duplex band Tx/Rx capability.

Referring to FIG. 3, the wireless transceiver 300 includes a baseband processor 302, a duplexer 312, an antenna 314, and a pair of local oscillators 318a and 318b, and includes dual filter/DACs 304a, dual filter/ADCs 304b, dual up-converters 306a, dual down-converters 306b, dual PAs 308a, and dual LNAs 308b. In another embodiment, dual baseband processors 302, dual duplexers 312, dual antennas 314, and local oscillators 318a and 318b may be included. The wireless transceiver 300 further includes a Tx/Rx mode or band switch 310 for switching Tx and Rx modes.

As such, the wireless transceiver 300 is greatly different from the wireless transceiver 100 illustrated in FIG. 1 or the wireless transceiver 200 illustrated in FIG. 2 in that the wireless transceiver 300 effectively has two Tx RF chains and two Rx RF chains, and includes the Tx/Rx mode or band switch 310, in order to support the duplex band Tx/Rx capability. By having two Tx/Rx RF chain pairs, the wireless transceiver 300 may include at least two PAs, two LNAs, two filter/converters for each frequency band, two mixers, etc. Alternatively, PAs or LNAs may be integrally designed to simultaneously cover dual bands far apart in frequency. In each sub-embodiment, the wireless transceiver 300 includes at least the two Tx RF chains and the two Rx RF chains.

An FDD RS including the wireless transceiver 300 having the two Tx/Rx RF chain pairs may support simultaneous Tx or simultaneous Rx on dual bands. In more detail, the FDD RS may respectively transmit/receive data to/from an MS and a BS on first and second frequencies f1 and f2 at one time by performing a Tx/Rx mode switching operation. Also, the FDD RS may transmit/receive data to/from the BS at a time t1 and transmit/receive data to/from the MS at a time t2 by performing a band switching operation.

An RS including the wireless transceiver 300 may simultaneously communicate with a BS and an MS, may switch Tx and Rx bands, and thus may perform various functions as an RS. However, while having a plurality of RF chains, the RS including the wireless transceiver 300 generally may not transmit/receive a multi-stream generated by performing spatial multiplexing. Thus, wireless resources and system components (i.e., the plurality of RF chains) may not be efficiently used. However, in the following embodiments of the present invention, a multiple antenna system is combined with a wireless transceiver in a frequency diversity (FD) mode.

The multiple antenna system includes a multiple input multiple output (MIMO) system, a multiple input single output (MISO) system, a single input multiple output (SIMO) system, etc. However, an FDD RS according to an embodiment of the present invention supports simultaneous Tx or simultaneous Rx on a plurality of frequency bands and thus, in the following description, an RS employing the MIMO system will be basically described. However, one of ordinary skill in the art may understand that a wireless transceiver according to any one of the following embodiments of the present invention may operate with the MISO system and/or the SIMO system.

A wireless transceiver in an FD mode, which employs a general MIMO system, includes a plurality of RF chain pairs which are separately connected to a plurality of antennas. Each of the RF chain pairs includes a Tx RF chain that operates on a first frequency f1 and an Rx RF chain that operates on a second frequency f2.

Figure 4:
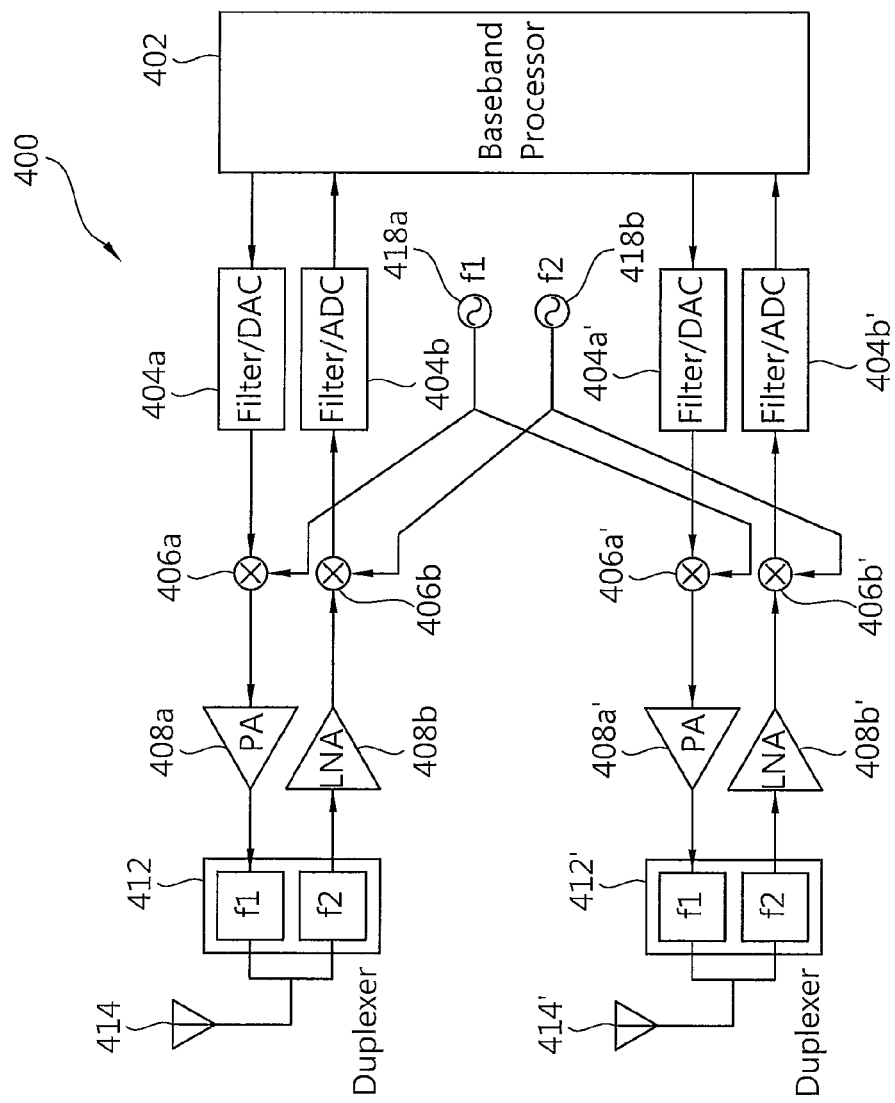
FIG. 4 is a block diagram showing an exemplary configuration of a wireless transceiver which employs a multiple input multiple output (MIMO) system and has two radio frequency (RF) chain pairs.

FIG. 4 is a block diagram showing an exemplary configuration of a wireless transceiver 400 which employs an MIMO system and has two RF chain pairs.

Referring to FIG. 4, the wireless transceiver 400 includes a baseband processor 402, dual filter/DACs 404a and 404a', dual filter/ADCs 404b and 404b', dual up-converters 406a and 406a', dual down-converters 406b and 406b', dual PAs 408a and 408a', dual LNAs 408b and 408b', dual duplexers 412 and 412', dual antennas 414 and 414', and local oscillators 418a and 418b.

However, the wireless transceiver 400 generally uses a first frequency f1 to transmit data and uses a second frequency f2 to receive data. That is, Tx and Rx frequencies of the wireless transceiver 400 may be fixed. Thus, when compared to a system including the wireless transceiver 300 illustrated in FIG. 3, a system including the wireless transceiver 400 may not perform basic functions as an RS at all in spite of the similarity in that a plurality of RF chains are included. In comparison to the system including the wireless transceiver 300 illustrated in FIG. 3, the system including the wireless transceiver 400 has advantages in that a data rate, i.e., a spectrum efficiency may be greatly improved by performing spatial multiplexing when communicating with another MIMO station.

In a wireless transceiver for an RS, according to an embodiment of the present invention, the Tx/Rx band-switching capability of the wireless transceiver 100 illustrated in FIG. 1 or the wireless transceiver 200 illustrated in FIG. 2 is combined with MIMO capability of the wireless transceiver 400.

Due to such combination, an RS including a wireless transceiver according to an embodiment of the present invention may function as an FDD RS for performing an HD operation or an FD operation, and an FDD MIMO RS, and also may perform simultaneous Tx or simultaneous Rx on different frequencies.

However, even in the RS including the above-described wireless transceiver, a simultaneous Tx and Rx function on the same frequency at the same time may be restricted because, when simultaneous Tx and Rx is performed on the same frequency at the same time, the wireless transceiver's own Tx signal can influence a corresponding Rx circuit, thereby causing self-saturation. However, if the self-saturation can be prevented, the RS including the above-described wireless transceiver may support simultaneous Tx and Rx on the same frequency at the same time. For example, if the RS may generate directional beams, a signal output through a Tx antenna may not influence an Rx antenna.

Figure 5:
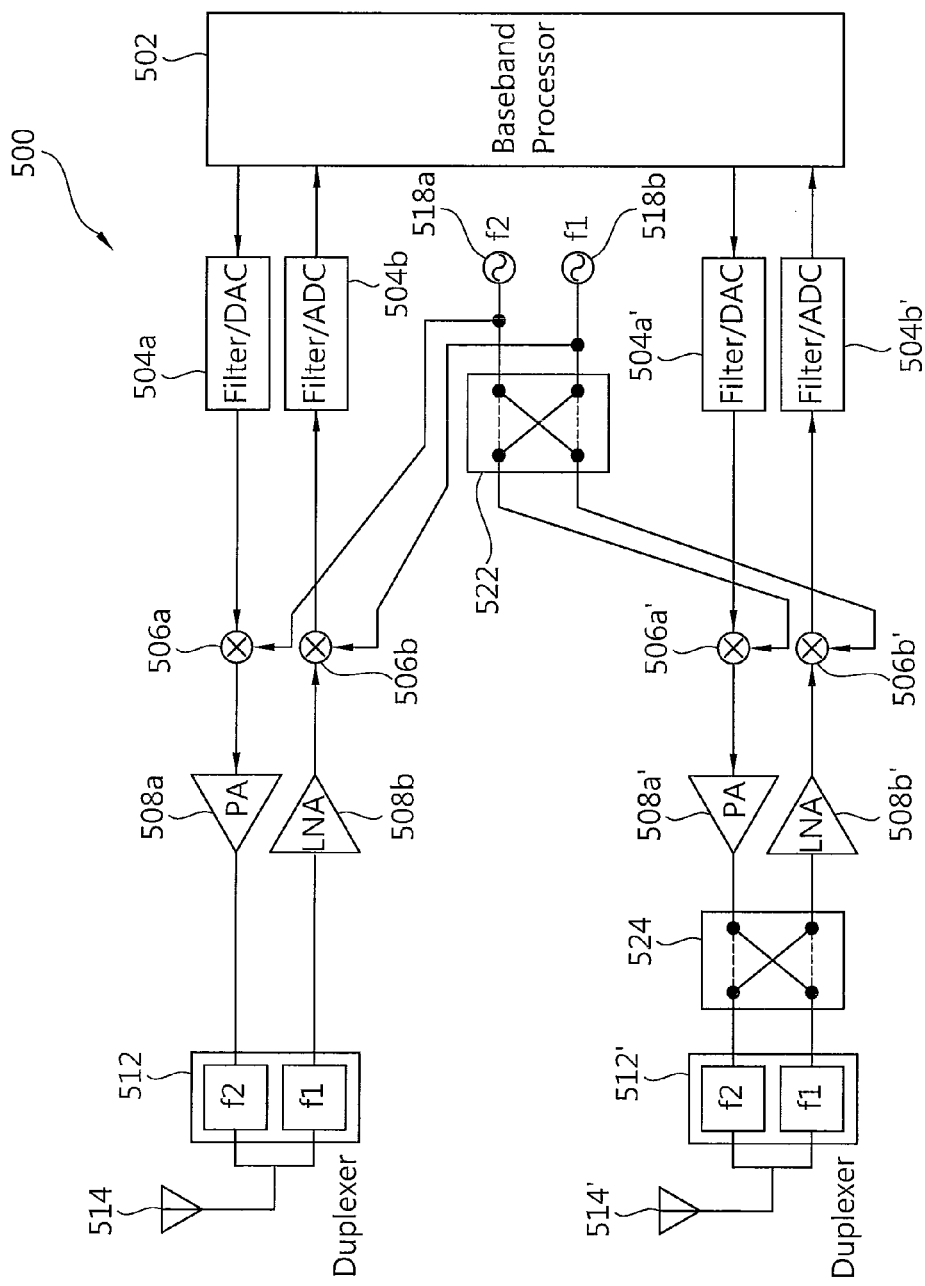
FIG. 5 is a block diagram showing an exemplary configuration of a wireless transceiver for an RS, according to a first embodiment of the present invention.
Figure 6:
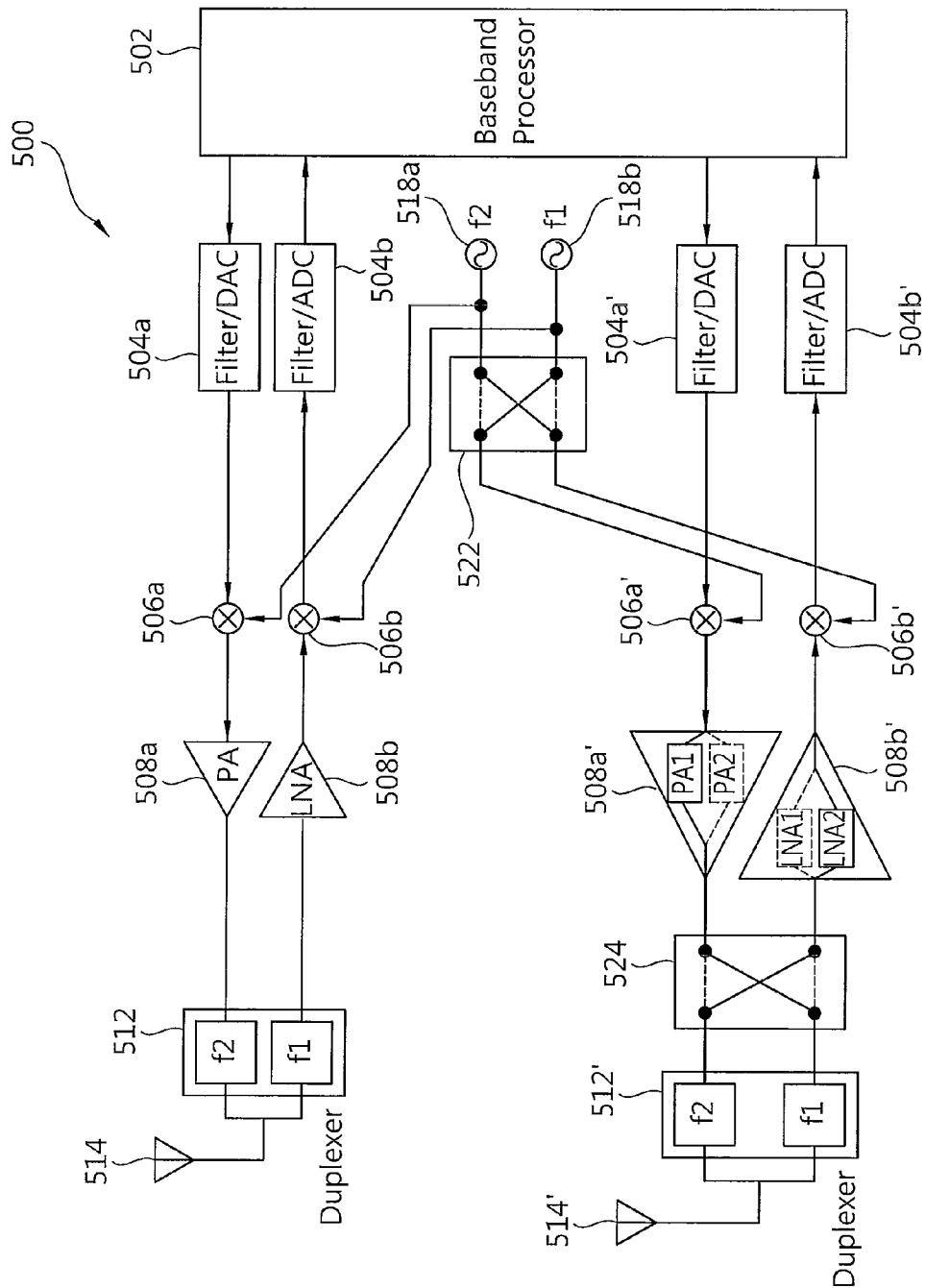
FIG. 6 is a block diagram showing another exemplary configuration of a wireless transceiver for an RS, according to the first embodiment of the present invention.

FIGS. 5 and 6 are block diagrams showing exemplary configurations of a wireless transceiver 500 for an RS, according to a first embodiment of the present invention. The wireless transceiver 500 illustrated in FIG. 5 or FIG. 6 is an example of how two Tx/Rx band switches are additionally combined to the wireless transceiver 400 illustrated in FIG. 4, which employs an MIMO system.

Referring to FIG. 5 or FIG. 6, the wireless transceiver 500 has two RF chain pairs and further includes first and second Tx/Rx band switches 522 and 524. In more detail, the wireless transceiver 500 includes a baseband processor 502, first and second filter/DACs 504a and 504a', first and second filter/ADCs 504b and 504b', first and second up-converters 506a and 506a', first and second down-converters 506b and 506b', first and second PAs 508a and 508a', first and second LNAs 508b and 508b', first and second duplexers 512 and 512', first and second antennas 514 and 514', and local oscillators 518a and 518b, and further includes the first and second Tx/Rx band switches 522 and 524 that are connected to an RF chain pair.

In FIG. 5 or FIG. 6, the first and second Tx/Rx band switches 522 and 524 may be connected to a pair of Tx and Rx RF chains related to the second antenna 514'. In more detail, the first Tx/Rx band switch 522 may be connected between the local oscillators 518a and 518b, and the second up-converter 506a' and the second down-converter 506b', and the second Tx/Rx band switch 524 may be connected between the second PA 508a' and the second LNA 508b', and the second duplexer 512'.

According to embodiments of the present invention (including the current embodiment and second through fourth embodiments of the present invention, which will be described later), a PA and an LNA are designed so as to operate on an uplink frequency (second frequency f2) band as well as a downlink frequency (first frequency f1) band. Methods of designing a PA and an LNA are not restrictive. FIGS. 5 and 6 show different methods of implementing a PA and an LNA.

For example, an amplifier of a wireless transceiver according to embodiments of the present invention may be an amplifier whose operation bandwidth is designed as a wideband so as to support both a downlink frequency (first frequency f1) and an uplink frequency (second frequency f2). In more detail, in FIG. 5, each of the second PA 508a' and the second LNA 508b' includes a wideband amplifier. In this case, the wideband amplifier may process signals on both the downlink frequency (first frequency f1) band and the uplink frequency (second frequency f2) band. Such an amplifier may have a simple configuration. However, its physical implementation is not easy because a wideband amplifier should be able to operate on a wideband.

Alternatively, an amplifier of a wireless transceiver according to various embodiments of the present invention may consist of a group of narrowband amplifiers that are designed to separately support the downlink frequency (first frequency f1) and the uplink frequency (second frequency f2). The narrowband amplifiers may be used when signals on different bands may not be easily processed by using a single amplifier because a bandwidth that can be processed by the single amplifier is physically restrictive in an aspect of actual implementation. In more detail, in FIG. 6, the second PA 508a' and the second LNA 508b' may respectively include both first narrowband amplifiers PA1 and LNA1 that operate on the downlink frequency (first frequency f1) band and second narrowband amplifiers PA2 and LNA2 that operate on the uplink frequency (second frequency f2) band, or may be implemented by using a soft RF method, etc. In this case, the second PA 508a' and the second LNA 508b' illustrated in FIG. 6 may respectively process signals by selecting corresponding narrowband amplifiers from among the first narrowband amplifiers PA1 and LNA1 and the second narrowband amplifiers PA2 and LNA2.

Hereinafter, it is assumed that the first frequency f1 is a downlink frequency and the second frequency f2 is an uplink frequency.

An RS including the wireless transceiver 500 may operate, for example, as represented below in Tables 1 through 3. In more detail, the RS performs an MIMO FD operation with a BS at a time t1 as represented in Table 1. The RS may perform simultaneous Tx to the BS and an MS as represented in Table 2 or perform simultaneous Rx from the BS and the MS as represented in Table 3, at a time t2.

TABLE 1

|  | f1 | f2 |
|---|---|---|
| First Antenna 514 | Rx1 | Tx1 |
| Second Antenna 514' | Rx2 | Tx2 |

Time = T1

TABLE 2

|  | f1 | f2 |
|---|---|---|
| First Antenna 514 |  | Tx1 |
| Second Antenna 514' | Tx2 |  |

Time = T2

TABLE 3

|  | f1 | f2 |
|---|---|---|
| First Antenna 514 | Rx1 |  |
| Second Antenna 514' |  | Rx2 |

Time = T2

Figure 7:
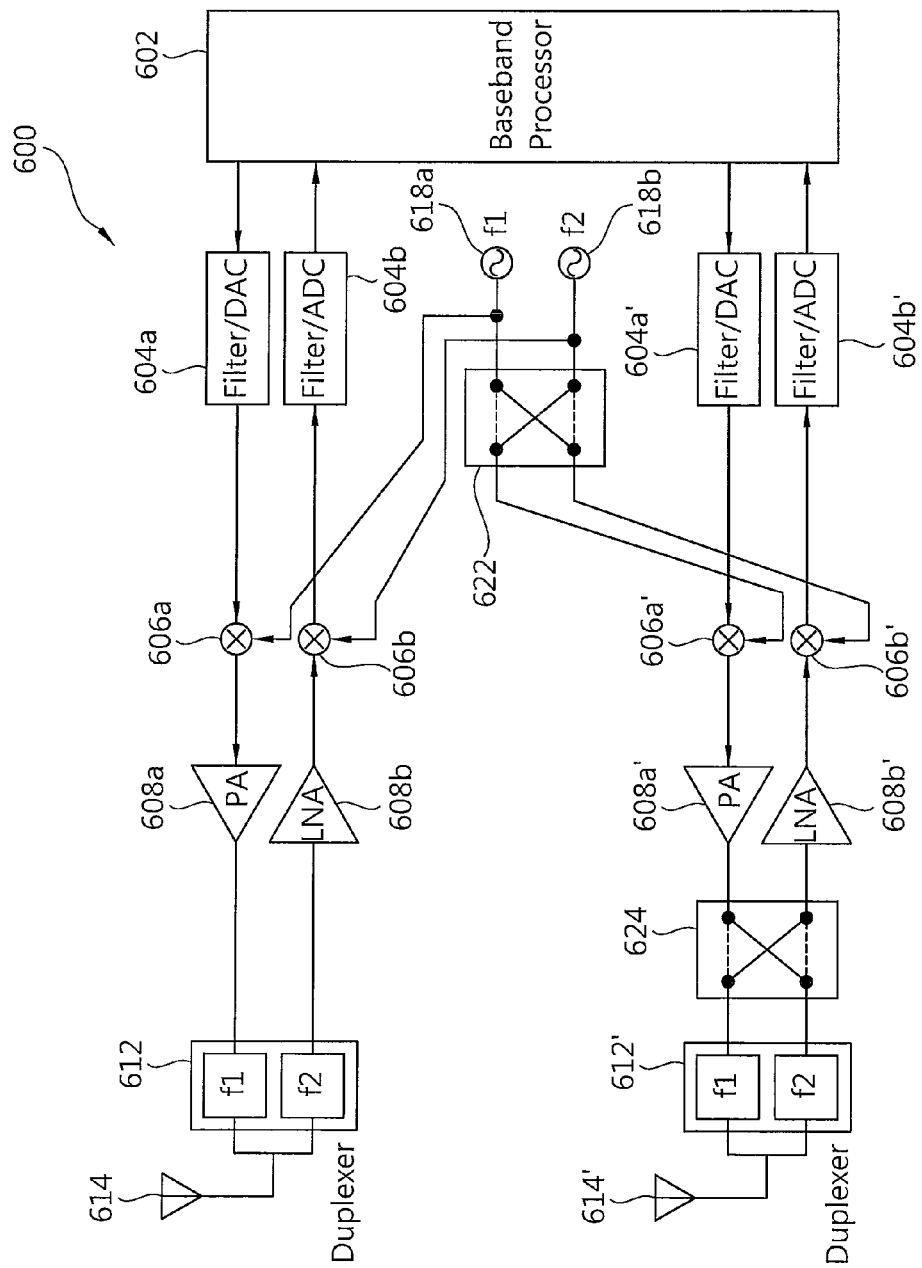
FIG. 7 is a block diagram showing another exemplary configuration of a wireless transceiver for an RS, according to the first embodiment of the present invention.

FIG. 7 is a block diagram showing another exemplary configuration of a wireless transceiver 600 for an RS, according to the first embodiment of the present invention. The wireless transceiver 600 illustrated in FIG. 7 is another example of two Tx/Rx band switches that are additionally combined to the wireless transceiver 400 illustrated in FIG. 4, which employs an MIMO system. In the wireless transceiver 600, a frequency of a Tx RF chain and a frequency of an Rx RF chain, that are connected to a first antenna 614, are opposite to those in the wireless transceiver 500 illustrated in FIG. 5 or FIG. 6.

Referring to FIG. 7, the wireless transceiver 600 includes a baseband processor 602, first and second filter/DACs 604a and 604a', first and second filter/ADCs 604b and 604b', first and second up-converters 606a and 606a', first and second down-converters 606b and 606b', first and second PAs 608a and 608a', first and second LNAs 608b and 608b', first and second duplexers 612 and 612', first and second antennas 614 and 614', and local oscillators 618a and 618b, and further includes first and second Tx/Rx band switches 622 and 624. The first and second Tx/Rx band switches 622 and 624 are connected to a pair of Tx and Rx RF chains. For example, in FIG. 7, the first and second Tx/Rx band switches 622 and 624 are connected to a pair of Tx and Rx RF chains related to the second antenna 614'. In more detail, the first Tx/Rx band switch 622 may be connected between the local oscillators 618a and 618b, and the second up-converter 606a' and the second down-converter 606b', and the second Tx/Rx band switch 624 may be connected between the second PA 608a' and the second LNA 608b', and the second duplexer 612'.

The wireless transceiver 600 is different from the wireless transceiver 500 illustrated in FIG. 5 or FIG. 6, in that a Tx RF chain connected to the first antenna 514 uses a second frequency f2 and an Rx RF chain connected to the first antenna 514 uses a first frequency f1, in that a Tx RF chain connected to the first antenna 614 uses the first frequency f1 and an Rx RF chain connected to the first antenna 614 uses the second frequency f2. Thus, an RS including the wireless transceiver 600 may operate, for example, as represented below in Tables 4 through 6. In more detail, the RS performs an MIMO FD operation with an MS at a time t1 as represented in Table 4. The RS may perform simultaneous Tx to a BS and the MS as represented in Table 5 or perform simultaneous Rx from the BS and the MS as represented in Table 6, at a time t2.

TABLE 4

|  | f1 | f2 |
|---|---|---|
| First Antenna 614 | Tx1 | Rx1 |
| Second Antenna 614' | Tx2 | Rx2 |

Time = T1

TABLE 5

|  | f1 | f2 |
|---|---|---|
| First Antenna 614 | Tx1 |  |
| Second Antenna 614' |  | Tx2 |

Time = T2

TABLE 6

|  | f1 | f2 |
|---|---|---|
| First Antenna 614 |  | Rx1 |
| Second Antenna 614' | Rx2 |  |

Time = T2

As described above, referring to FIGS. 5 through 7, an RS including the wireless transceiver 500 or 600 according to the first embodiment of the present invention may perform simultaneous Tx to or simultaneous Rx from a BS and an MS. However, a MIMO FD operation is restrictively supported. Tx and Rx RF chains connected to the first antenna 514 or 614 generally operate on one frequency such as the first frequency f1 or the second frequency f2 and thus the wireless transceiver 500 or 600 may not change an operation frequency of each of the Tx and Rx RF chains connected to the first antenna 514 or 614. However, the RS including the wireless transceiver 500 or 600 according to the first embodiment of the present invention may be selectively used to perform various RS functions and MIMO functions by minimizing changes of a typical MIMO transceiver.

Figure 8:
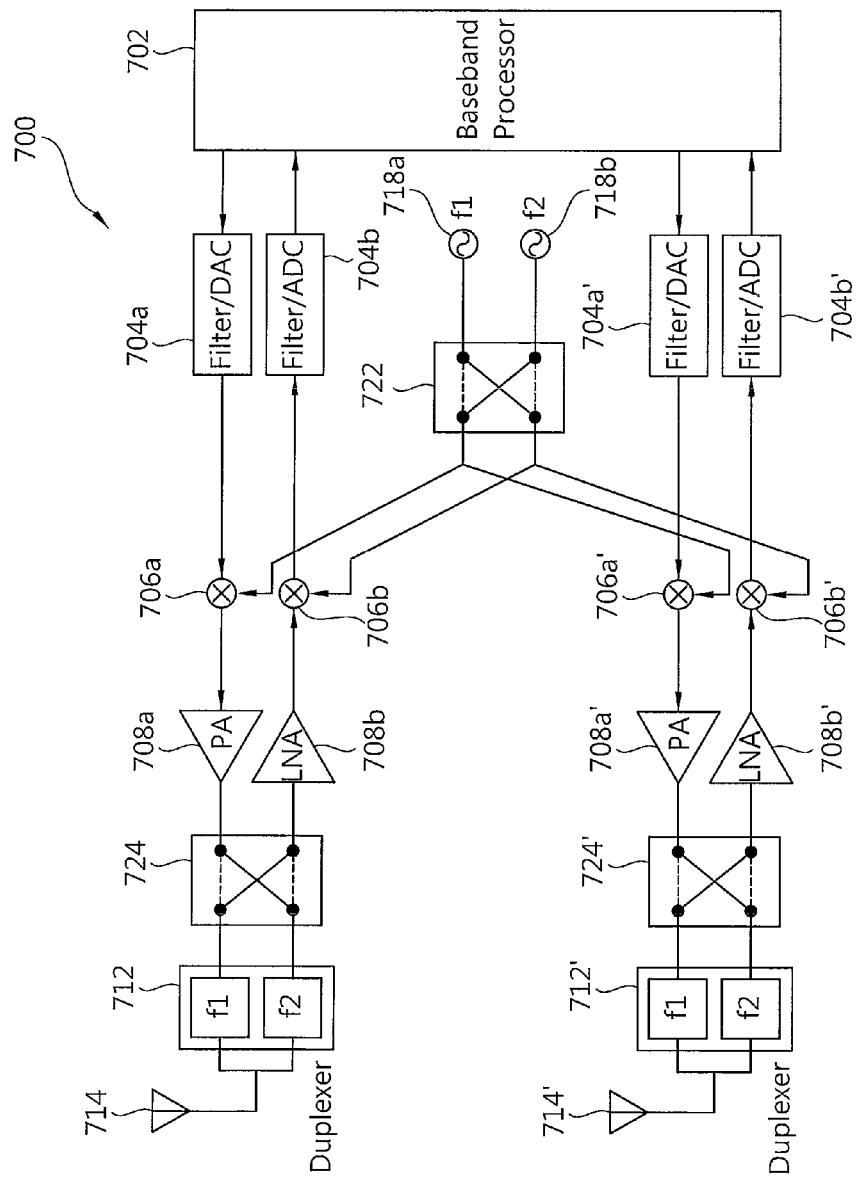
FIG. 8 is a block diagram showing an exemplary configuration of a wireless transceiver for an RS, according to a second embodiment of the present invention.

FIG. 8 is a block diagram showing an exemplary configuration of a wireless transceiver 700 for an RS, according to a second embodiment of the present invention. The wireless transceiver 700 illustrated in FIG. 8 is an example when three Tx/Rx band switches are additionally combined to the wireless transceiver 400 illustrated in FIG. 4, which employs an MIMO system. As such, the wireless transceiver 700 is more advantageous than the wireless transceiver 500 or 600 according to the first embodiment of the present invention, with respect to a data rate of an RS or a spatial multiplexing rate, in that an MIMO FD operation is available at any time by switching Tx and Rx bands on a plurality of frequencies. However, in the wireless transceiver 700, Tx RF chains connected to different antennas use the same frequency band and Rx RF chains connected to the different antennas use the same frequency band. Thus, an RS may not be able to support a function of simultaneously transmitting/receiving data to/from a BS and an MS by using the two frequency bands.

Referring to FIG. 8, the wireless transceiver 700 includes a baseband processor 702, first and second filter/DACs 704a and 704a', first and second filter/ADCs 704b and 704b', first and second up-converters 706a and 706a', first and second down-converters 706b and 706b', first and second PAs 708a and 708a', first and second LNAs 708b and 708b', first and second duplexers 712 and 712', first and second antennas 714 and 714', and local oscillators 718a and 718b, and further includes first through third Tx/Rx band switches 722, 724, and 724'. From among the first through third Tx/Rx band switches 722, 724, and 724', one end of the first Tx/Rx band switch 722 is connected to the local oscillators 718a and 718b and the other end is split so as to be separately connected to the first up-converter 706a and the first down-converter 706b, and the second up-converter 706a' and the second down-converter 706b'. The second Tx/Rx band switch 724 is connected between the first PA 708a and the first LNA 708b, and the first duplexer 712, and the third Tx/Rx band switch 724' is connected between the second PA 708a' and the second LNA 708b', and the second duplexer 712'.

An RS including the wireless transceiver 700 may operate, for example, as represented below in Tables 7 and 8. In more detail, the RS may perform an MIMO FD operation with an MS at a first time t1 as represented in Table 7, and may perform an MIMO FD operation with a BS at a second time t2 (Tx/Rx band switching based relaying). However, the RS may not simultaneously transmit/receive data to/from the BS and the MS (dual-band Tx/Rx based relaying). In this case, each of the first and second PAs 708a and 708a', and the first and second LNAs 708b and 708b' may be implemented as a wideband amplifier that is designed to support a wideband, or as a group of narrowband amplifiers that are designed to separately support two frequency bands, in order to support both a first frequency f1 and a second frequency f2. However, a method of implementing an amplifier is not specially limited thereto.

TABLE 7

|  | f1 | f2 |
|---|---|---|
| First Antenna 714 | Tx1 | Rx1 |
| Second Antenna 714' | Tx2 | Rx2 |

Time = T1

TABLE 8

|  | f1 | f2 |
|---|---|---|
| First Antenna 714 | Rx1 | Tx1 |
| Second Antenna 714' | Rx2 | Tx2 |

Time = T2

Figure 9:
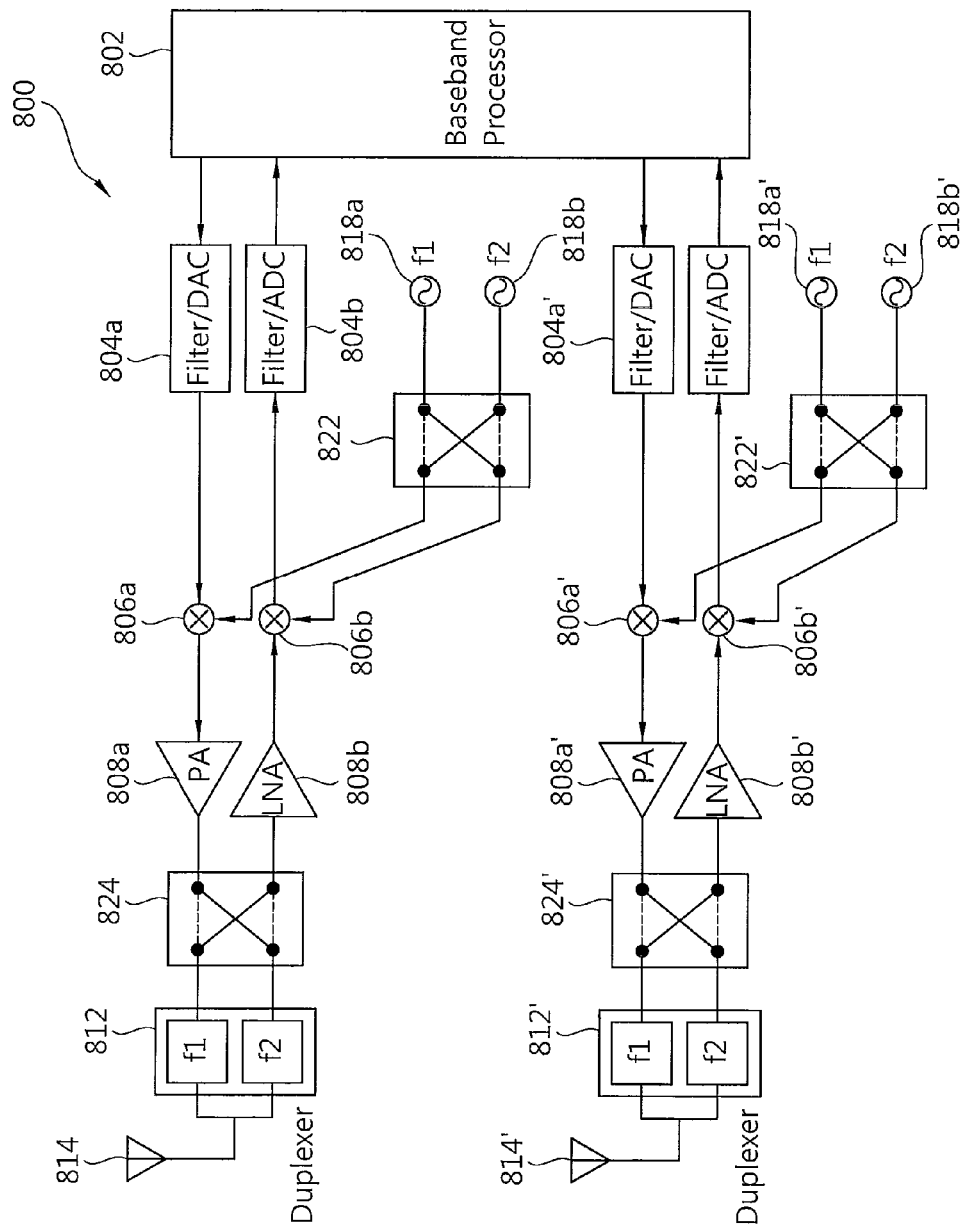
FIG. 9 is a block diagram showing an exemplary configuration of a wireless transceiver for an RS, according to a third embodiment of the present invention.

FIG. 9 is a block diagram showing an exemplary configuration of a wireless transceiver for an RS, according to a third embodiment of the present invention. The wireless transceiver 800 illustrated in FIG. 9 is an example when four Tx/Rx band switches are additionally combined to the wireless transceiver 400 illustrated in FIG. 4, which employs an MIMO system.

Referring to FIG. 9, the wireless transceiver 800 includes two RF chain pairs. In more detail, the wireless transceiver 800 includes a baseband processor 802, first and second filter/DACs 804a and 804a', first and second filter/ADCs 804b and 804b', first and second up-converters 806a and 806a', first and second down-converters 806b and 806b', first and second PAs 808a and 808a', first and second LNAs 808b and 808b', first and second duplexers 812 and 812', first and second antennas 814 and 814', and two pairs of first local oscillators 818a and 818b and second local oscillators 818a' and 818b'. Although the two pairs of the first local oscillators 818a and 818b and the second local oscillators 818a' and 818b' are illustrated in FIG. 9 for convenience of explanation, the first local oscillators 818a and 818b and the second local oscillators 818a' and 818b' may be integrated into a single pair.

The wireless transceiver 800 further includes first through fourth Tx/Rx band switches 822, 822', 824, and 824'. From among the first through fourth Tx/Rx band switches 822, 822', 824, and 824', the first Tx/Rx band switch 822 is connected between the first local oscillators 818a and 818b, and the first up-converter 806a and the first down-converter 806b, and the second Tx/Rx band switch 822' is connected between the second local oscillators 818a' and 818b', and the second up-converter 806a' and the second down-converter 806b'. The third Tx/Rx band switch 824 is connected between the first PA 808a and the first LNA 808b, and the first duplexer 812, and the fourth Tx/Rx band switch 824' is connected between the second PA 808a' and the second LNA 808b', and the second duplexer 812'. As such, the wireless transceiver 800 is different from the wireless transceiver 500 or 600 according to the first embodiment of the present invention in that an MIMO FD operation is available by switching Tx and Rx bands on a plurality of frequencies. Also, the wireless transceiver 800 is different from the wireless transceiver 700 according to the second embodiment of the present invention in that Tx RF chains connected to the first and second antennas 814 and 814' may use the same frequency band or different frequency bands (the same principal is applied to Rx RF chains) and thus simultaneous Tx or simultaneous Rx on two frequency bands is available.

The wireless transceiver 800 including the first through fourth Tx/Rx band switches 822, 822', 824, and 824' may variously combine dual-band Tx/Rx modes and operation modes of an operation mode band switching system of a multiple antenna system on a plurality of frequencies. Thus, relay operations according to various scenarios may be supported and efficiency of an RS may be maximized. On the other hand, an RS including the wireless transceiver 500, 600, or 700 according to the first or second embodiment of the present invention may restrictively provide some of various functions provided by an RS including the wireless transceiver 800 according to the third embodiment of the present invention. Operation modes supported by the wireless transceiver 800 will now be described in detail.

Figure 10:
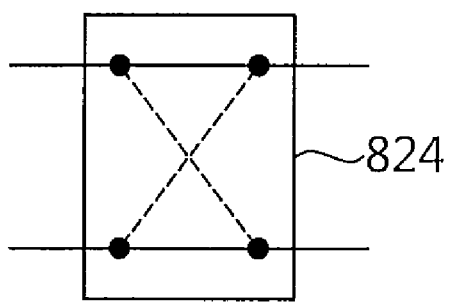
FIG. 10 is a schematic diagram showing connection states of first through fourth Tx/Rx band switches in a first operation mode of the wireless transceiver illustrated in FIG. 9.
Figure 10:
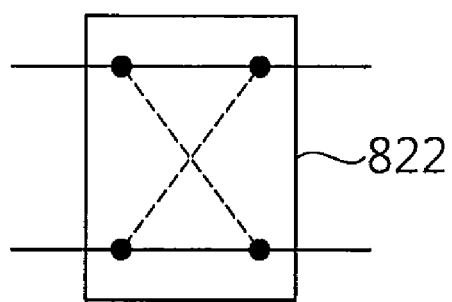
Figure 10:
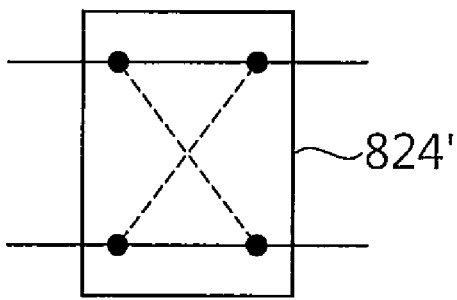
Figure 10:
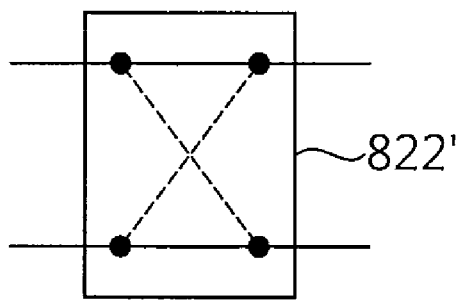
Figure 11:
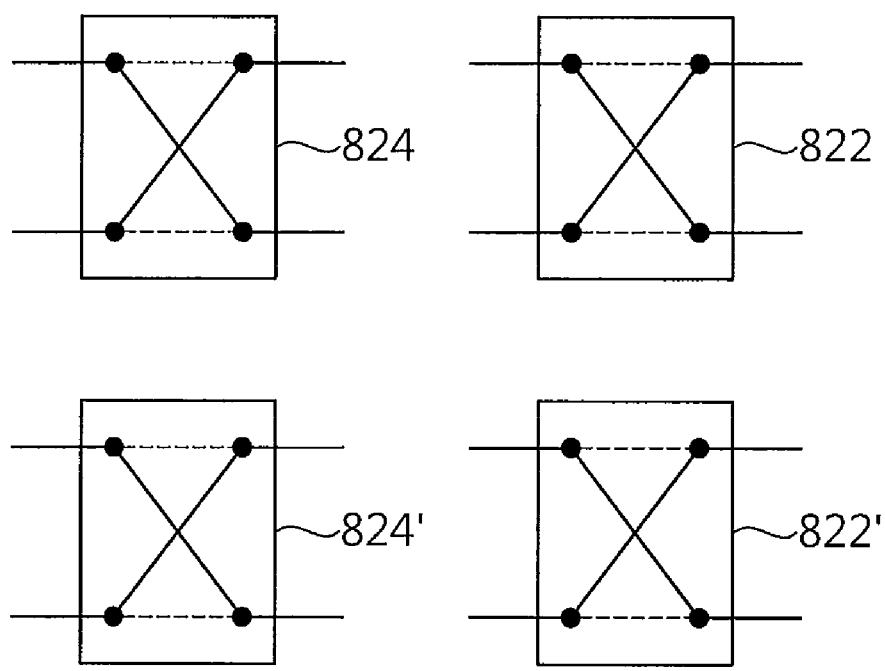
FIG. 11 is a schematic diagram showing connection states of first through fourth Tx/Rx band switches in a second operation mode of the wireless transceiver illustrated in FIG. 9.

The wireless transceiver 800 may flexibly support four operation modes depending on scheduling or opportunity. FIGS. 10 through 13 are schematic diagrams respectively showing connection states of the first through fourth Tx/Rx band switches 822, 822', 824, and 824' in four operation modes of the wireless transceiver 800. FIG. 10 shows the connection states of the first through fourth Tx/Rx band switches 822, 822', 824, and 824' in a first operation mode of the wireless transceiver 800, in which an RS may perform an MIMO FD operation with an MS (see Table 9). FIG. 11 shows the connection states of the first through fourth Tx/Rx band switches 822, 822', 824, and 824' in a second operation mode of the wireless transceiver 800, in which the RS may perform an MIMO (i.e., multi-stream Tx/Rx on each band) FD operation with a BS (see Table 10).

TABLE 9

|  | f1 | f2 |
| --- | --- | --- |
| First Antenna 814 | Tx1 | Rx1 |
| Second Antenna 814' | Tx2 | Rx2 |

TABLE 10

|  | f1 | f2 |
| --- | --- | --- |
| First Antenna 814 | Rx1 | Tx1 |
| Second Antenna 814' | Rx2 | Tx2 |

Figure 12:
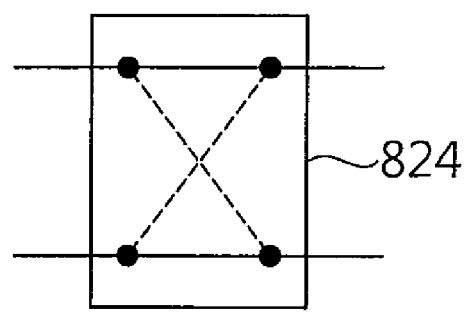
FIG. 12 is a schematic diagram showing connection states of first through fourth Tx/Rx band switches in a third operation mode of the wireless transceiver illustrated in FIG. 9.
Figure 12:
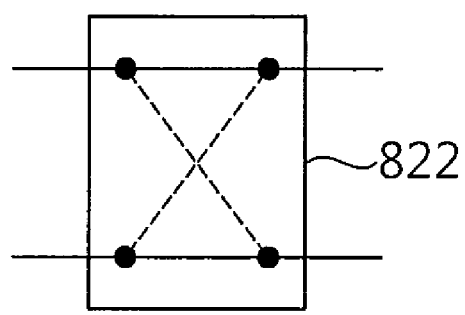
Figure 12:
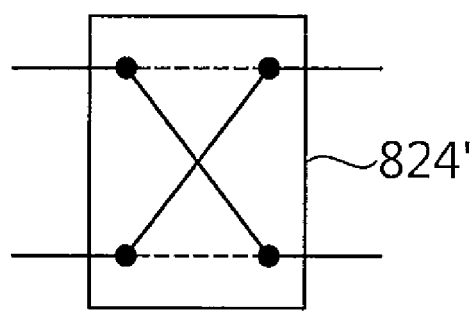
Figure 12:
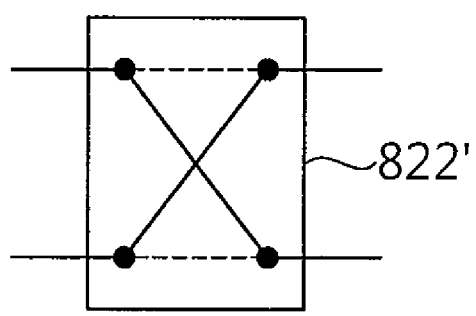
Figure 13:
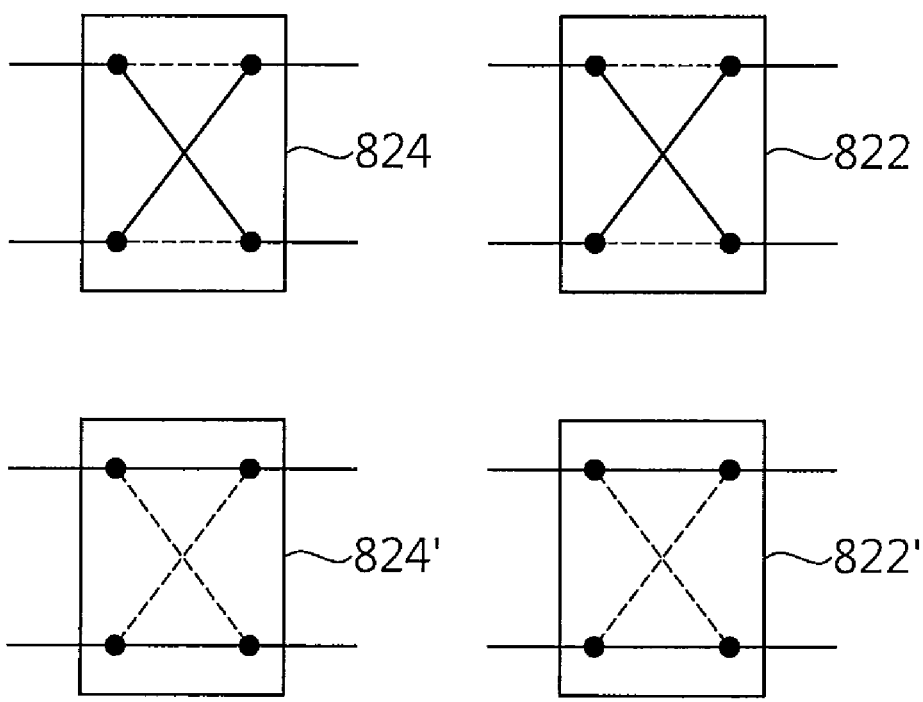
FIG. 13 is a schematic diagram showing connection states of first through fourth Tx/Rx band switches in a fourth operation mode of the wireless transceiver illustrated in FIG. 9.

FIGS. 12 and 13 respectively show the connection states of the first through fourth Tx/Rx band switches 822, 822', 824, and 824' in third and fourth operation modes of the wireless transceiver 800. In this case, although the RS performs dual-band Tx/Rx, as described above with reference to FIG. 4, simultaneous Tx and Rx on the same frequency band is restrictive due to a self-saturation problem. Thus, in the third operation mode illustrated in FIG. 12 or the fourth operation mode illustrated in FIG. 13, the RS may perform only a single-input/single-output (SISO) (i.e., single stream Tx/Rx on each band) HD operation by performing simultaneous Tx to or simultaneous Rx from the BS and the MS (see Tables 11 through 14). In this case, each of the first and second PAs 808a and 808a', and the first and second LNAs 808b and 808b' may be implemented as a wideband amplifier that is designed to support a wideband, or a group of narrowband amplifiers that are designed to separately support two frequency bands, in order to support both a first frequency f1 and a second frequency f2. However, a method of implementing an amplifier is not specially limited thereto.

TABLE 11

|  | f1 | f2 |
| --- | --- | --- |
| First Antenna 814 | Tx1 |  |
| Second Antenna 814' |  | Tx2 |

TABLE 12

|  | f1 | f2 |
| --- | --- | --- |
| First Antenna 814 |  | Rx1 |
| Second Antenna 814' | Rx2 |  |

TABLE 13

|  | f1 | f2 |
| --- | --- | --- |
| First Antenna 814 |  | Tx1 |
| Second Antenna 814' | Tx2 |  |

TABLE 14

|  | f1 | f2 |
| --- | --- | --- |
| First Antenna 814 | Rx1 |  |
| Second Antenna 814' |  | Rx2 |

Referring to Tables 11 through 14, even when the RS performs the SISO HD operation, a diversity of selecting antennas and bands for dual-band Tx or dual-band Rx may be ensured. In more detail, when the dual-band Tx or dual-band Rx is performed, the first antenna 814 may use the first frequency f1 and the second antenna 814' may use the second frequency f2, or, the first antenna 814 may use the second frequency f2 and the second antenna 814' may use the first frequency f1.

If these four operation modes are used, the RS including the wireless transceiver 800 may support relay operations according to various scenarios.

Initially, the RS may transmit and receive an FD MIMO stream to and from the BS and/or the MS. An exemplary scenario when the RS does not have a decoding error is as described below.

The RS receives first and second transport blocks TB1 and TB2 from the BS on the first frequency f1 and successfully decodes the first and second transport blocks TB1 and TB2, at a first time t1 (BS→RS).

The RS transmits ACK responses for the first and second transport blocks TB1 and TB2 to the BS on the second frequency f2 at a second time t2 (RS→BS). (This step may not be performed depending on a transport protocol.)

The RS transmits the first and second transport blocks TB1 and TB2 to a single MS or two MSs (if multiple users exist) on the first frequency f1 at a third time t3 (RS→MS).

The RS receives ACK/negative acknowledgement (NACK) responses for the first and second transport blocks TB1 and TB2 from the MS on the second frequency f2 at a fourth time t4 (MS→RS).

The RS may transmit two ACK responses for the first and second transport blocks TB1 and TB2 to the BS on the second frequency 2 at a fifth time f5 (RS→BS) Alternatively, the RS may transmit an ACK response for the first transport block TB1 and a NACK response for the second transport block TB2 on the second frequency f2 at the fifth time f5, and, in this case, the RS may retransmit the second transport block TB2 to the MS on the first frequency f1 (BS←RS(→MS)). Alternatively, the RS may transmit two NACK responses for the first and second transport blocks TB1 and TB2 on the second frequency f2 at the fifth time f5, and, in this case, the RS may retransmit one of the first and second transport blocks TB1 and TB2 to a corresponding MS on the first frequency f1

(BS←RS(→MS)). Then, the other of the first and second transport blocks TB1 and TB2 will be retransmitted later.

The RS including the wireless transceiver 800 may efficiently retransmit a partially decoded downlink multi-codeword MIMO stream. An exemplary scenario when one of transport blocks that are transmitted by the BS and are received by the RS has an error is as described below.

The RS receives first and second transport blocks TB1 and TB2 from the BS on the first frequency f1 and successfully decodes only the first transport block TB1, at a first time t1 (BS→RS).

The RS transmits the first transport block TB1 to the MS on the first frequency f1 and transmits a NACK response for the second transport block TB2 to the BS on the second frequency f2, at a second time t2 (BS←RS→MS). In this case, depending on a transport protocol, an ACK response for the first transport block TB1 may also be transmitted to the BS.

The RS receives a second transport block TB2' that is retransmitted from the BS on the first frequency f1 and receives an ACK/NACK response for the first transport block TB1 from the BS on the second frequency f2, at a third time t3 (BS←RS→MS).

The RS transmits the second transport block TB2' to the MS on the first frequency f1 (in this case, depending on a transport protocol, an ACK response for the second transport block TB2' may also be transmitted to the BS.), and transmits the ACK/NACK response for the first transport block TB1 to the BS on the second frequency f2, at a fourth time t4 (BS←RS→MS). Alternatively, the RS may transmit a NACK response for each of the first transport block TB1 and the second transport block TB2' to the BS on the second frequency f2, and may retransmit a first transport block TB1' to the MS on the first frequency f1 (BS←RS→MS). Alternatively, the RS may transmit a NACK response for the second transport block TB2' and an ACK response for the first transport block TB1 to the BS on the second frequency f2 (BS←RS).

Also, the RS including the wireless transceiver 800 may efficiently retransmit a partially decoded uplink multi-codeword MIMO stream. An exemplary scenario when one of transport blocks that are transmitted by the MS and are received by the RS has an error is as described below.

The RS receives first and second transport blocks TB1 and TB2 from the MS on the second frequency f2 and successfully decodes only the first transport block TB1, at a first time t1 (MS→RS).

The RS transmits the first transport block TB1 to the BS on the second frequency f2 and transmits a NACK response for the second transport block TB2 to the MS on the first frequency f1, at a second time t2 (BS←RS→MS). In this case, depending on a transport protocol, an ACK response for the first transport block TB1 may also be transmitted to the MS.

The RS receives a second transport block TB2' that is retransmitted from the MS on the second frequency f2 and receives an ACK/NACK response for the first transport block TB1 from the BS on the first frequency f1, at a third time t3 (BS→RS←MS).

The RS transmits the second transport block TB2' to the BS on the second frequency f2 (in this case, depending on a transport protocol, an ACK response for the second transport block TB2' may also be transmitted to the MS.), and transmits an ACK/NACK response for the first transport block TB1 to the MS on the first frequency f1, at a fourth time t4 (BS←RS→MS). Alternatively, the RS may transmit a NACK response for each of the first transport block TB1 and the second transport block TB2' to the MS on the first frequency f1, and may retransmit a first transport block TB1' to the BS on the second frequency f2 (BS←RS→MS). Alternatively, the RS may transmit a NACK response for the second transport block TB2' and an ACK response for the first transport block TB1 to the MS on the first frequency f1 (RS→MS).

If the four operation modes described above with reference to FIGS. 10 through 13 are used, the RS including the wireless transceiver 800 may perform data communication by selecting a combination having the best performance from among various combinations between one of a plurality of antennas and one of a plurality of frequencies. For example, in the first through fourth operation modes illustrated in FIGS. 10 through 13, the RS may select a combination having a higher channel gain from among a combination of (h1(f1), h2(f2)) and a combination of (h1(f2), h2(f1)), thereby increasing diversity. (Here, $h_i(f_j)$ represents a channel gain of a link connected to an i-th antenna of the RS on a frequency $f_j$.)

Figure 14:
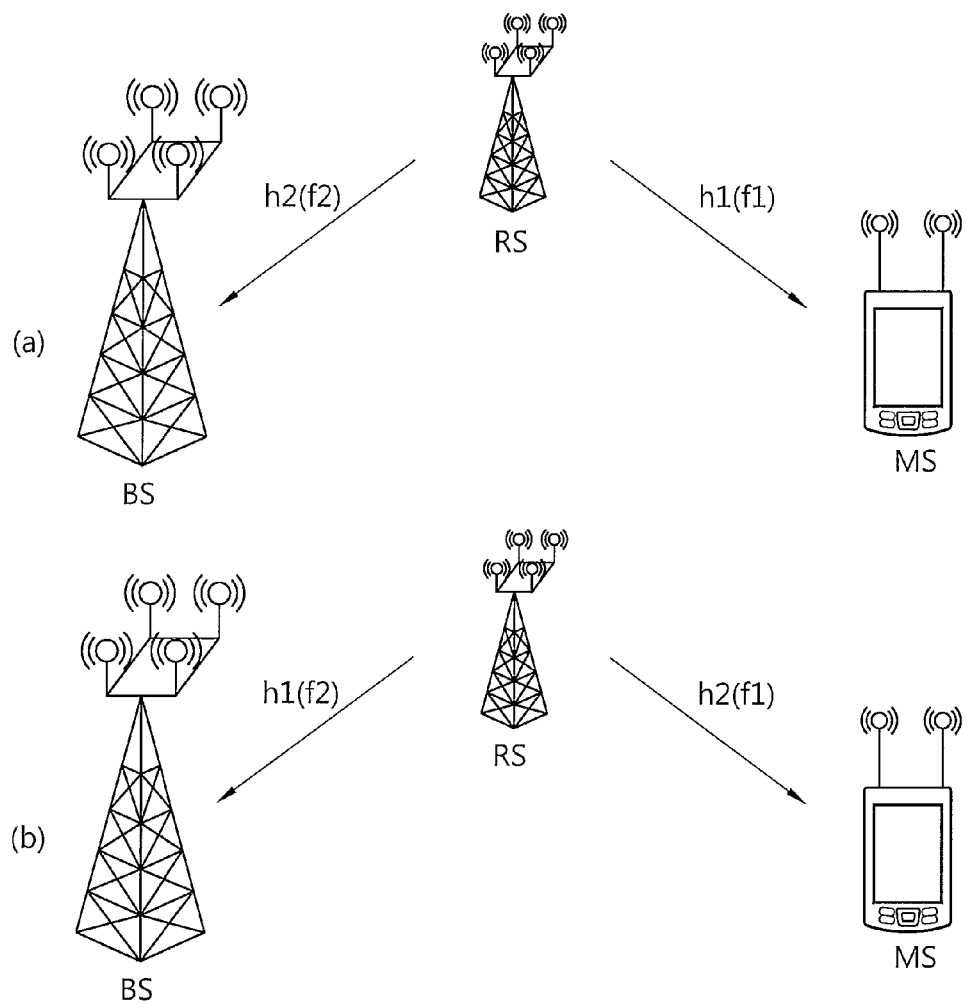
FIG. 14 is a schematic diagram showing combinations between antennas and frequencies which may be selected by an RS in order to transmit data.

FIG. 14 is a schematic diagram showing combinations between antennas and frequencies which may be selected by an RS in order to transmit data.

Referring to FIG. 14, the RS for performing simultaneous Tx to a BS and an MS may select a combination having a higher total channel gain at a corresponding time, from among a combination of (h1(f1), h2(f2)) in which a first antenna is used on a first frequency f1 (downlink) and a second antenna is used on a second frequency f2 (uplink) (see (a) of FIG. 14) and a combination of (h2(f1), h1(f2)) in which the second antenna is used on the first frequency f1 (downlink) and the first antenna is used on the second frequency f2 (uplink) (see (b) of FIG. 14).

Figure 15:
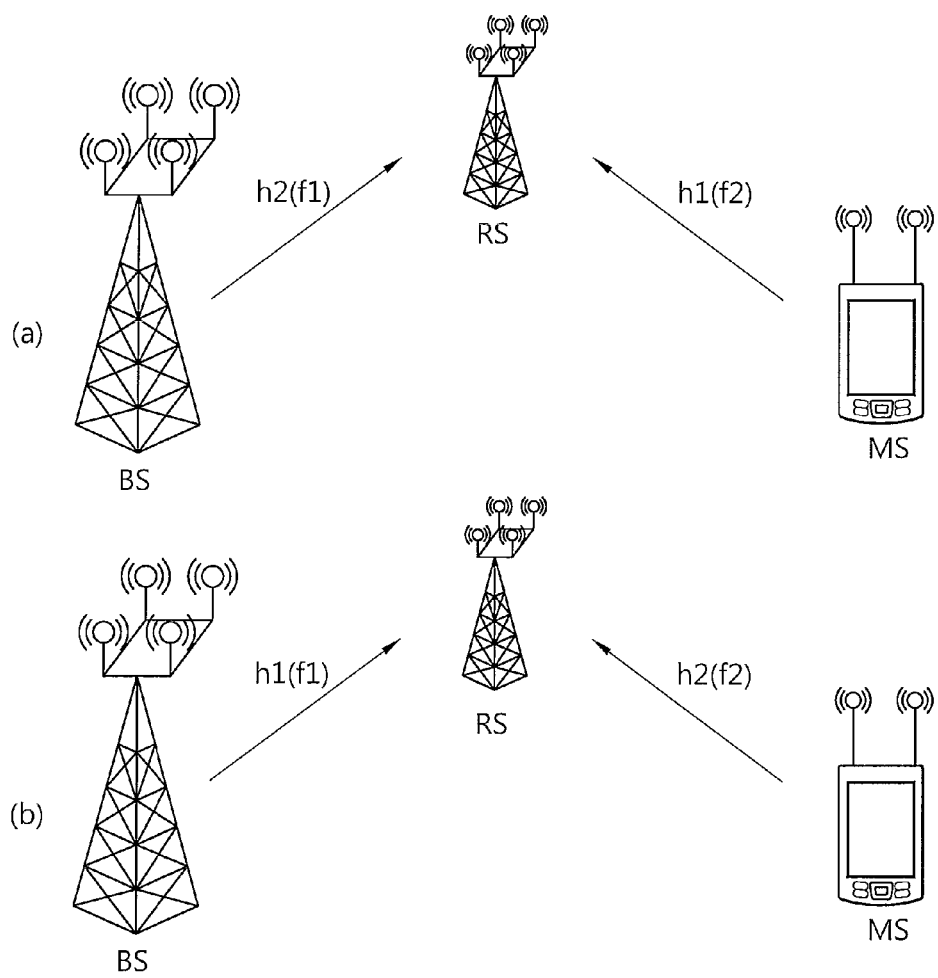
FIG. 15 is a schematic diagram showing combinations between antennas and frequencies which may be selected by an RS in order to receive data.

FIG. 15 is a schematic diagram showing combinations between antennas and frequencies which may be selected by an RS in order to receive data.

Referring to FIG. 15, the RS for performing simultaneous Rx from a BS and an MS may select a combination having a higher total channel gain at a corresponding time, from among a combination of (h2(f1), h1(f2)) in which a second antenna is used on a first frequency f1 (downlink) and a first antenna is used on a second frequency f2 (uplink) (see (a) of FIG. 15) and a combination of (h1(f1), h2(f2)) in which the first antenna is used on the first frequency f1 (downlink) and the second antenna is used on the second frequency f2 (uplink) (see (b) of FIG. 15).

Data throughput may be improved by using a plurality of RSs each including the wireless transceiver 800 according to the third embodiment of the present invention. In more detail, the data throughput may be improved as each of the plurality of RSs selectively performs Tx/Rx band switching based relaying or dual-band Tx/Rx based relaying according to states of links with a superordinate station and a subordinate station, for example, channel gains. A method of improve data throughput by using a plurality of RSs will now be described in detail on the assumption that data communication is performed by using two RSs between a BS and an MS.

Figure 16:
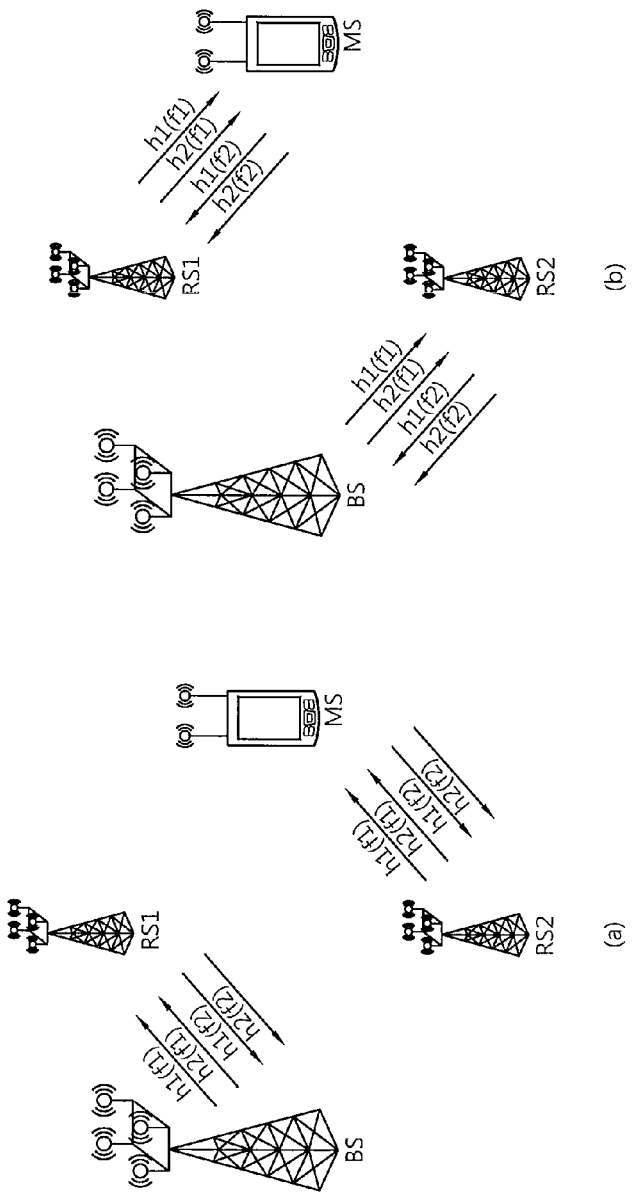
FIG. 16 is a schematic diagram showing an exemplary case when first and second RSs relay data communication between a base station (BS) and a mobile station (MS).

FIG. 16 is a schematic diagram showing an exemplary case when first and second RSs RS1 and RS2 relay data communication between a BS and an MS. In FIG. 16, the first and second RSs RS1 and RS2 perform Tx/Rx band switching based relaying. The exemplary case illustrated in FIG. 16 may be selected if a total channel gain when both the first and second RSs RS1 and RS2 operate in an MIMO FD mode is higher than the total channel gain when both the first and second RSs RS1 and RS2 operate in an SISO RD mode. (a) and (b) of FIG. 16 are respectively illustrated with respect to times t1 and t2.

Referring to FIG. 16, at the first time t1, the first RS RS1 operates in the MIMO FD mode so as to communicate with the BS while the second RS RS2 operates in the MIMO FD mode so as to communicate with the MS. As a result, the first RS RS1 receives data to be transmitted to the MS at the second time t2, from the BS (h1(f1) and h2(f1)) and transmits data received from the MS before the first time t1, to the BS (h1(f2) and h2(f2)), at the same time. The second RS RS2 receives data to be transmitted to the BS at the second time t2, from the MS (h1(f2) and h2(f2)) and transmits data received from the BS before the first time t1, to the MS (h1(f1) and h2(f1)), at the same time. Oppositely to the first time t1, at the second time t2, the first RS RS1 operates in the MIMO FD mode so as to communicate with the MS while the second RS RS2 operates in the MIMO FD mode so as to communicate with the BS. As a result, the first RS RS1 transmits data received from the BS at the first time t1, to the MS (h1(f1) and h2(f1)) and receives data to be transmitted to the BS after the second time t2, from the MS (h1(f2) and h2(f2)), at the same time. The second RS RS2 transmits data received from the MS at the first time t1, to the BS (h1(f2) and h2(f2)) and receives data to be transmitted to the MS after the second time t2, from the BS (h1(f1) and h2(f1)), at the same time.

Figure 17:
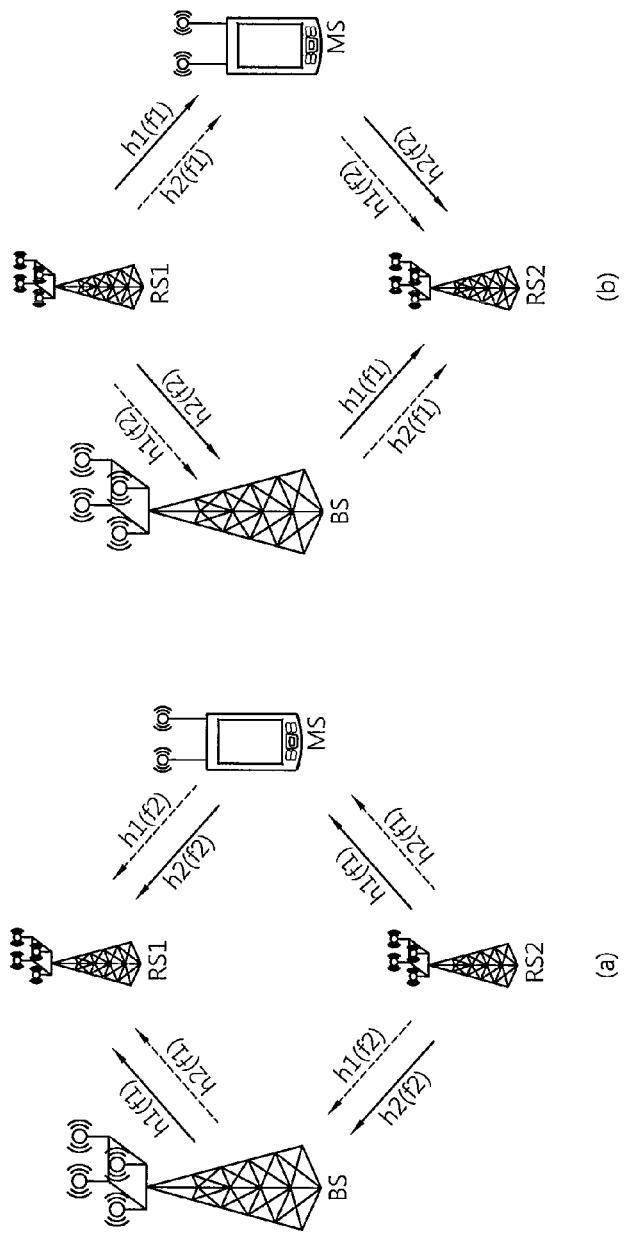
FIG. 17 is a schematic diagram showing another exemplary case when first and second RSs relay data communication between a BS and an MS.

FIG. 17 is a schematic diagram showing another exemplary case when first and second RSs RS1 and RS2 relay data communication between a BS and an MS. In FIG. 17, the first and second RSs RS1 and RS2 perform dual-band Tx/Rx based relaying. The exemplary case illustrated in FIG. 17 may be selected if a total channel gain when both the first and second RSs RS1 and RS2 operate in an SISO HD mode is higher than the total channel gain when both the first and second RSs RS1 and RS2 operate in an MIMO FD mode. (a) and (b) of FIG. 17 are respectively illustrated with respect to first and second times t1 and t2.

Referring to FIG. 17, at the first time t1, the first RS RS1 operates in the SISO HD mode so as to receive data from the BS and the MS while the second RS RS2 operates in the SISO HD mode so as to transmit data the BS and the MS. As a result, the first RS RS1 receives data to be transmitted to the MS at the second time t2, from the BS (h1(f1) or h2(f1)) and receives data to be transmitted to the BS at the second time t2, from the MS (h1(f2) or h2(f2)), at the same time. The second RS RS2 transmits data received from the MS before the first time t1, to the BS (h1(f2) or h2(f2)) and transmits data received from the BS before the first time t1, to the MS (h1(f1) or h2(f1)), at the same time. At the second time t2, the first RS RS1 operates in the SISO HD mode so as to transmit data the BS and the MS while the second RS RS2 operates in the SISO HD mode so as to receive data from the BS and the MS. As a result, the first RS RS1 transmits data received from BS at the first time t1, to MS (h1(f1) or h2(f1)) and transmits data received from MS at the first time t1, to BS (h1(f2) or h2(f2)), at the same time. The second RS RS2 receives data to be transmitted to the BS after the second time t2, from MS (h1(f2) or h2(f2)) and receives data to be transmitted to the BS after the second time t2, from BS (h1(f1) or h2(f1)), at the same time.

Hereinabove, configurations and operations of a wireless transceiver for an RS, which has two RF chain pairs (i.e., an MIMO system having two antennas) have been described. However, one of ordinary skill in the art may understand that technical features of the present invention may also be applied to a wireless transceiver for an RS, which has three or more RF chain pairs (i.e., an MIMO system having three or more antennas). When the wireless transceiver having three or more RF chain pairs is used, more various operation modes including a mono-directional Tx/Rx mode, a bi-directional Tx mode, or a bi-directional Rx mode of a multi-stream, may be achieved.

For example, downlink/uplink asymmetric traffic transmission may be supported by unequally setting the number of RF chain pairs for transmitting/receiving data on different frequencies. In more detail, it is assumed that a wireless transceiver has four RF chain pairs. In this case, an RS including the wireless transceiver may transmit four downlink signals, three downlink signals and one uplink signal, two downlink signals and two uplink signals, one downlink signal and three uplink signals, or four uplink signals. When four downlink signals or four uplink signals are transmitted, the RS may transmit four downlink signals and receive four uplink signals at the same time, or may transmit four uplink signals and receive four downlink signals at the same time.

Also, an RS including a wireless transceiver according to any one of the above embodiments of the present invention may support not only spatial multiplexing but also transmit diversity which have been mainly described with reference to an MIMO system. For example, the RS may support the transmit diversity by using space-time block codes (STBCs) or space-frequency block codes (SFBCs).

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A wireless transceiver for a relay station (RS), the wireless transceiver comprising:
a plurality of antennas; and
a plurality of radio frequency (RF) chain pairs which are coupled one-to-one to the plurality of antennas, each of the plurality of RF chain pairs configured to operate on both a downlink frequency and an uplink frequency or to operate only on one of the downlink frequency and the uplink frequency,
wherein each of the plurality of RF chain pairs is configured to switch a transmission (Tx) frequency and a reception (Rx) frequency between the downlink frequency and the uplink frequency,
wherein each of the plurality of RF chain pairs comprises:
a first Tx/Rx band switch coupled between a local oscillator pair and a mixer pair; and
a second Tx/Rx band switch coupled between an amplifier pair and a duplexer.

2. The wireless transceiver of claim 1, wherein each amplifier coupled to a corresponding second Tx/Rx band switch comprises a wideband amplifier configured to support the downlink frequency and the uplink frequency, or a group of narrowband amplifiers configured to separately support the downlink frequency and the uplink frequency.

3. The wireless transceiver of claim 1, wherein only one of the plurality of RF chain pairs is configured to switch the Tx frequency and the Rx frequency between the downlink frequency and the uplink frequency.

4. The wireless transceiver of claim 1, wherein each of the plurality of RF chain pairs is configured to switch the Tx frequency and the Rx frequency between the downlink frequency and the uplink frequency.

5. The wireless transceiver of claim 4, wherein all of the plurality of RF chain pairs are configured to be switched to the same Tx frequency and the same Rx frequency.

6. The wireless transceiver of claim 5,
wherein the plurality of RF chain pairs are arranged to share the first Tx/Rx band switch.

7. The wireless transceiver of claim 4, wherein each of the plurality of RF chain pairs is configured to be independently switched to the Tx frequency and to the Rx frequency.

8. The wireless transceiver of claim 7,
wherein each of the plurality of RF chain pairs independently comprises the first Tx/Rx band switch.

9. The wireless transceiver of claim 1, wherein the wireless transceiver is arranged within a relay station (RS) of a frequency division duplex (FDD) wireless communication system.

* * * * *